United States Patent
Jang et al.

[11] Patent Number: 6,152,503
[45] Date of Patent: Nov. 28, 2000

[54] VEHICLE BUMPER

[76] Inventors: Jin-Kyu Jang, 261-8 Bangok-ri, Jungkwan-myun, Gijang-kun; Jae-Hyok Jang, 261-8 Bangok-ri, Jungkwan-myun, Gijang-kun, both of Pusan, Rep. of Korea

[21] Appl. No.: 09/400,300

[22] Filed: Sep. 21, 1999

[30] Foreign Application Priority Data

Sep. 22, 1998 [KR] Rep. of Korea ............ 98-18283

[51] Int. Cl.⁷ .................................................. B60R 19/18
[52] U.S. Cl. .................................. 293/17; 293/58; 293/125
[58] Field of Search .................. 293/17, 49, 58, 293/107, 110, 125

[56] References Cited

U.S. PATENT DOCUMENTS

| | | | |
|---|---|---|---|
| 616,102 | 12/1898 | Heesem | 293/17 |
| 3,708,195 | 1/1973 | Kottsieper | 293/125 |
| 3,961,818 | 6/1976 | Roth, Jr. | |
| 4,186,913 | 2/1980 | Bruner et al. | 256/13.1 |
| 5,238,228 | 8/1993 | Moon | 256/13.1 |

*Primary Examiner*—Dennis H. Pedder

[57] ABSTRACT

Disclosed is a vehicle bumper which is capable of exerting an excellent shock-absorber against an external impact. The vehicle bumper of the present invention includes: a plurality of cushion tubes installed in the interior of a bumper casing and each having a hub wheel mounted in series on a horizontal axis; the horizontal axis adapted to be inserted through a rectangular hole formed on each front surfaces of a plurality of projection boards projected from a vehicle frame, to thereby have a predetermined distance on the rectangular hole; an axial rod adapted to be assembled on the both ends of the horizontal axis to thereby couple the plurality of cushion tubes in a horizontal state; and a tube frame adapted to be installed on the rear portion of the plurality of cushion tubes, for supporting each cushion tube.

3 Claims, 3 Drawing Sheets

VEHICLE BUMPER

BACKGROUND OF THE INVENTION

1. Field of the Invention

The present invention relates to a vehicle bumper serving as an excellent shock-absorber against an external impact, and more particularly, to a vehicle bumper which is provided with a plurality of cushion tubes in the interior of a bumper cover, under the arrangement where they are in series installed on a horizontal axis on each face surface of the front and back portions of the vehicle and installed on a vertical axis on the both sides of the front and back portions thereof, whereby it can exhibit a shock-absorbing performance superior to existing vehicle bumpers.

2. Discussion of the Prior Art

Generally, a conventional vehicle bumper includes a bumper band made of synthetic resin which is attached on the front and back portions of the vehicle, respectively and a bubbling buffering shim material or a synthetic resin hollow pack which is mounted in the interior of the bumper band, for absorbing an external shock. However, the conventional vehicle bumper has a weak recovering force upon generation of collision against an external vehicle or object, which may be likely to destroy the bumper band. In addition, the conventional vehicle bumper fails to exert an excellent buffering performance, such that it can not previously prevent the generation of various kinds of accidents.

On the other hand, there has been proposed a conventional impact absorbing frame bumper having a square shape or other shapes, which is protrudedly attached to the front portion or the rear portion of an automobile. However, the conventional impact absorbing frame bumper has a function of absorbing a primary impact, but fails to exhibit a strong and sufficient buffering and recovering force. As a result, the conventional impact absorbing frame bumper has some problems in that heavy impact may be applied to the passengers and a serious damage thereto may occur.

SUMMARY OF THE INVENTION

An object of the present invention is to provide a vehicle bumper which is capable of exerting an excellent shock absorption against an external impact.

Another object of the present invention is to provide a vehicle bumper which is capable of protecting all of the vehicle itself and an object or passengers, upon generation of a relative slight impact against the bumper.

Yet another object of the present invention is to provide a vehicle bumper which is capable of improving stability on running of the vehicle.

To achieve these and other objects of the present invention, there is provided a vehicle bumper comprises: a plurality of cushion tubes installed in the interior of a bumper casing and each having a hub wheel mounted in series on a horizontal axis; the horizontal axis adapted to be inserted through a rectangular hole formed on each front surfaces of a plurality of projection boards projected from a vehicle frame, to thereby have a predetermined distance on the rectangular hole; an axial rod adapted to be assembled on the both ends of the horizontal axis to thereby couple the plurality of cushion tubes in a horizontal state; and a tube frame adapted to be installed on the rear portion of the plurality of cushion tubes, for supporting each cushion tube.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
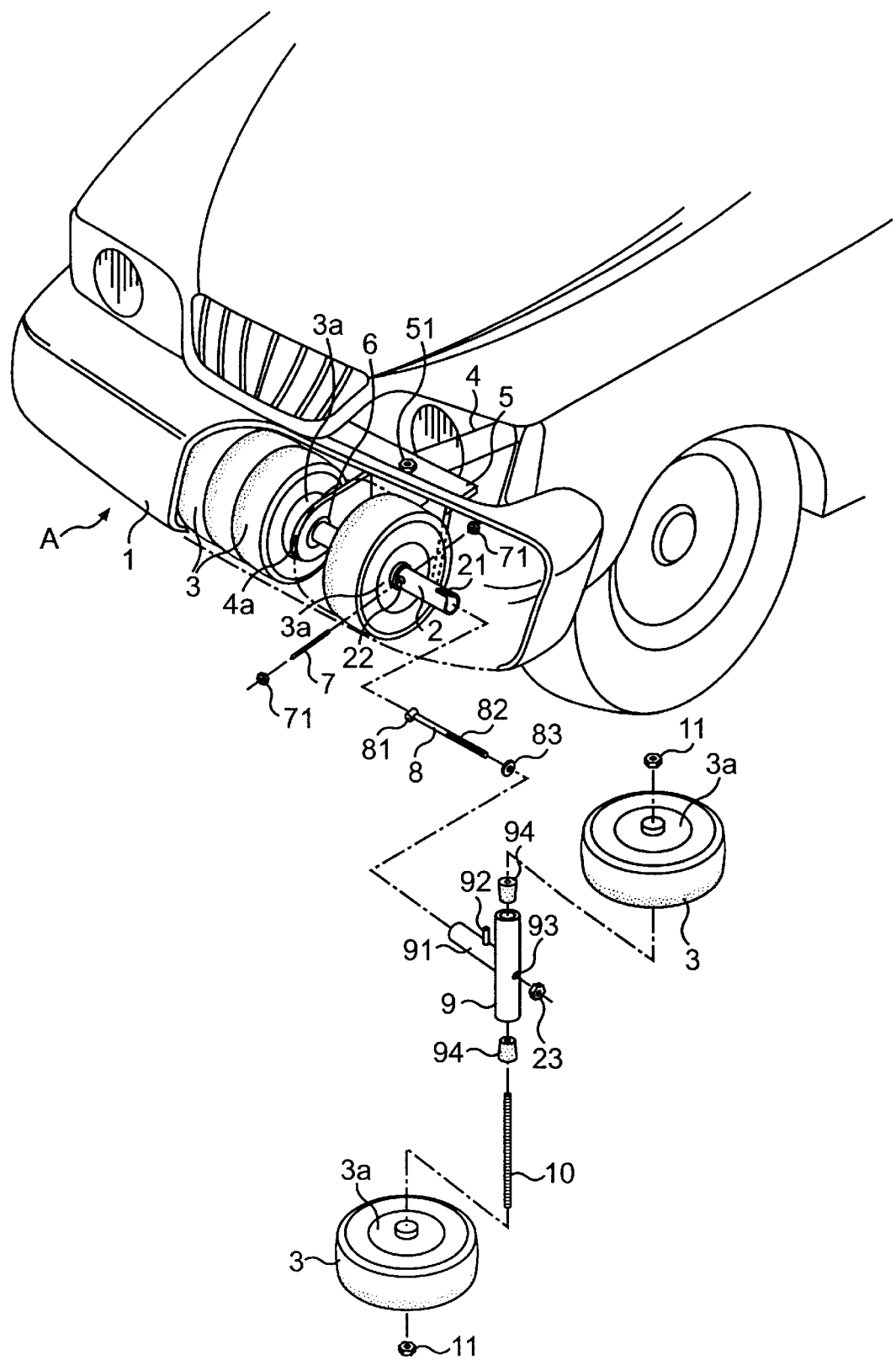
FIG. 1 is a separated perspective view illustrating the structure of a vehicle bumper according to the present invention.

Hereinafter, an explanation on the structure of a vehicle bumper according to the present invention will be in detail discussed with reference to FIGS. 1 to 3.

Firstly, as discussed in the above, the conventional vehicle bumper is embodied to install a bubbling material, a buffering shim material or a plastic pack having no elasticity in the interior of a synthetic resin bumper casing, such that the shim material or pack may be readily destroyed upon generation of heavy impact against external objects to thereby lose its recovering capability, which of course directly applies impact load to a driver or passenger.

To solve such the problem, a vehicle bumper of the present invention is provided with a plurality of cushion tubes having an excellent recovering elastic force, which are installed in a rigid body frame, such that a primary impact can be absorbed by the recovering elastic force generated from the plurality of cushion tubes and the rigid body frame, and a heavy impact exceeding the recovering elastic force can be absorbed by the absorbing action of the horizontal and vertical axes to which the cushion tubes are mounted and the tube frame.

To protect all of the vehicle itself and an object or a passenger upon generation of a relative slight impact against the bumper, the vehicle bumper of the present invention is provided with a rectangular hole which is formed on a plurality of projection boards, respectively, through which the horizontal axis of the cushion tubes is inserted and has a predetermined interval from the horizontal axis to move forwardly/backwardly the horizontal axis upon generation of external impact. Therefore, if the relative weak impact is applied, the cushion tube horizontal axis moves slightly in the reverse direction in proportion to impact quantity by the formation of the rectangular hole on each projection boards, and then returns to the forward direction by the action of the elastic repulsion force from the compressed cushion tubes and the rigid body frame. As the damped impact force by the interactive repulsion force is continually applied to the vehicle bumper of the present invention, the impact absorption can be fully achieved. In other words, the vehicle bumper of the present invention has a similar mechanical function to a structure where a plurality of elastic springs which are coupled in parallel are mounted.

Upon the generation of contact and collision with a relative slight impact, the bumper of the present invention can achieve the impact absorption by the spring buffering action thereof, such that it can prevent the damage of the vehicle and the injury of the passenger and reduce the amount of impact applied to the collided object.

To improve stability on running of the vehicle, the vehicle bumper of the present invention is installed symmetrically on the front and rear portions of the vehicle, respectively, while having an appropriate load, such that the center of mass on the vehicle itself can be moved only to the downward direction, without any variation thereof in every direction.

Generally, in case of high speed running of the vehicle, buoyancy generation is caused by the formation of current variation generated around the vehicle itself and thereby suspension of the vehicle itself from the road surface is generated. In this case, the vehicle having the vehicle bumper of the present invention can ensure the stability of vehicle itself owing to the center of mass loaded to the downward direction and can prevent the inclination to one side or overturn of the vehicle caused due to the centrifugal force upon running on a curved road.

Figure 2:
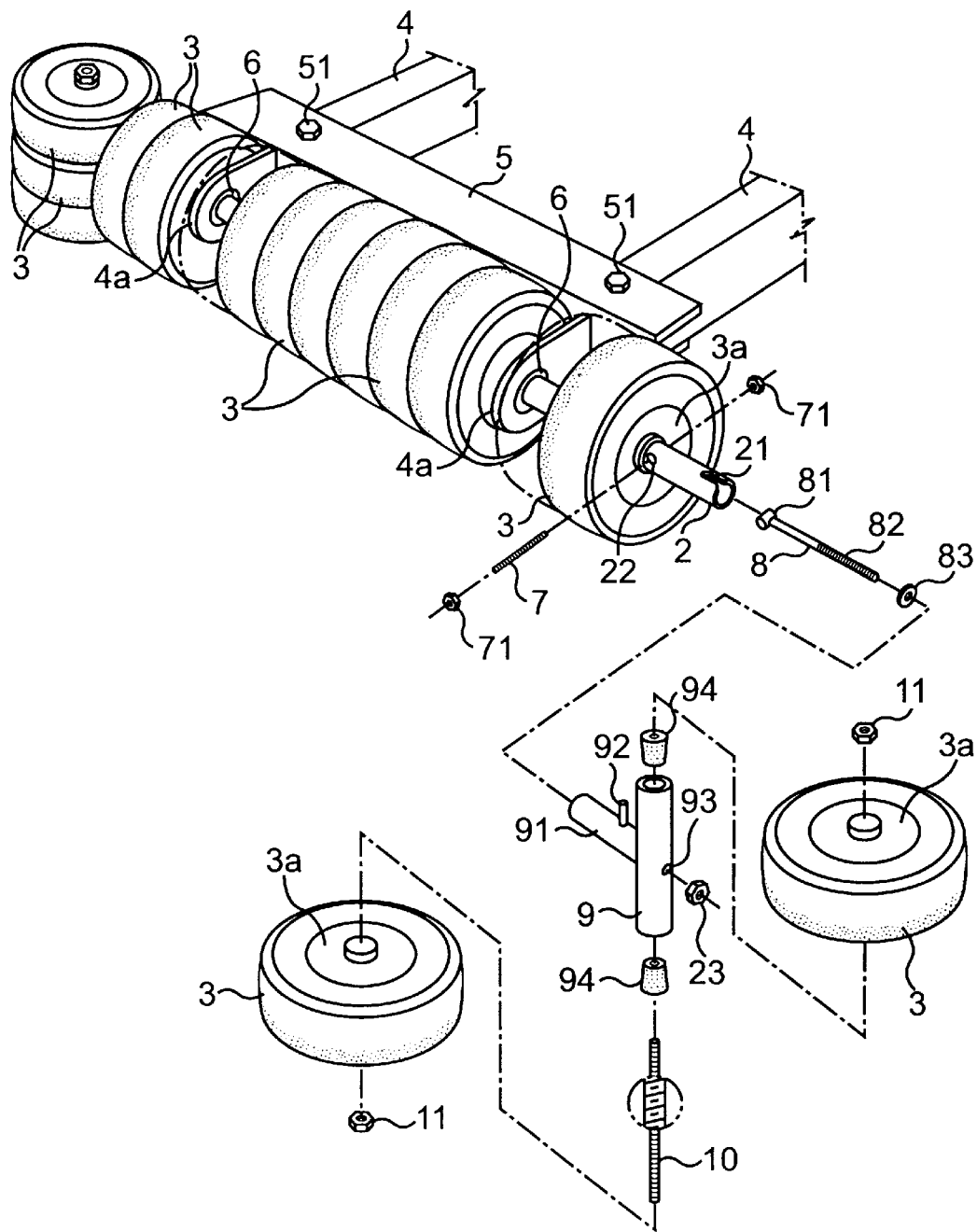
FIG. 2 is an exploded and separated perspective view illustrating main components of FIG. 1.

FIG. 1 is a separated perspective view illustrating the structure of a vehicle bumper according to the present invention.

In a preferred embodiment of the present invention, a bumper casing 1 of the bumper A of the present invention forms a cushion cover which is made of polyurethane and a buffering synthetic resin, and in the interior of the cushion cover, a plurality of cushion tubes 3 are installed in series on a horizontal axle or axis 2 and in a horizontal direction on a vertical axis 9, on the face surfaces of the front and rear portions of the vehicle.

In more detail, the bumper A is attached in such a manner that a tube frame 5 is fixedly installed, by means of a fixing bolt 51, on the front portion of a vehicle frame 4 and a plurality of projection boards 4a are protrudedly installed on the front portion of the tube frame 5. A rectangular hole 6 is formed on each projection board 4a, and the horizontal axis 2 having a concave groove 21 and a pin hole 22 on the both ends thereof is inserted into the rectangular hole 6. The plurality of cushion tubes 3 are inserted in series through the horizontal axis 2.

Under the state where the plurality of cushion tubes 3 are inserted in series through the horizontal axis 2, the cushion tubes 3 on the both sides which are finally inserted through the horizontal axis 2 are secured on the horizontal axis 2 by fitting a thread pin 7 into the pin hole 22 and coupling the thread pin 7 by means of a nut 71.

Upon the fitting of the thread pin 7, a connection rod 8, which forms a thread tube 81 on the front portion thereof and a thread part 82 on the other side thereof, is inserted into the inside of the horizontal axis 2, and then the thread pin 7 is thread-coupled to the thread tube 81 to pass through the pin hole 22. A coupling ring 83, which is adapted to prevent the swing of the connection rod 8, is inserted into the inside of the horizontal axis 2 and supports the connection rod 8.

On the other hand, an insert tube 91 having a stopper pin 92 adapted to be inserted into the concave groove 21 formed on the both sides of the horizontal axis 2 is formed to be integrated with an axial rod 9 into which a packing 94 adapted to support the thread rod 10 is inserted in the inside thereof. As a result, the plurality of cushion tubes 3 are inserted horizontally on the both sides of the upper and lower portions of the axial rod 9 and are securely coupled by means of a coupling nut 11.

The axial rod 9 is coupled with the horizontal axis 2 in such a manner that the thread part 82 of the connection rod 8, which passes through the insert tube 91 and is protruded through a pin hole 93, is coupled with a nut 23. The plurality of cushion tubes 3 coupled in the horizontal direction on the axial rod 9 serve to absorb the impact applied to the left and right sides of the vehicle. After the completion of coupling, the bumper casing 1 is covered on the exterior of the coupled components to finish an external appearance of the vehicle bumper.

In the inserting manner of each cushion tube 3, a hub wheel as a center axis of the cushion tube 3 is fixedly inserted horizontally through the axial rod 9 and in series through the horizontal axis 2, such that the plurality of cushion tubes 3 can be stably fixed within the bumper casing 1.

Figure 3:
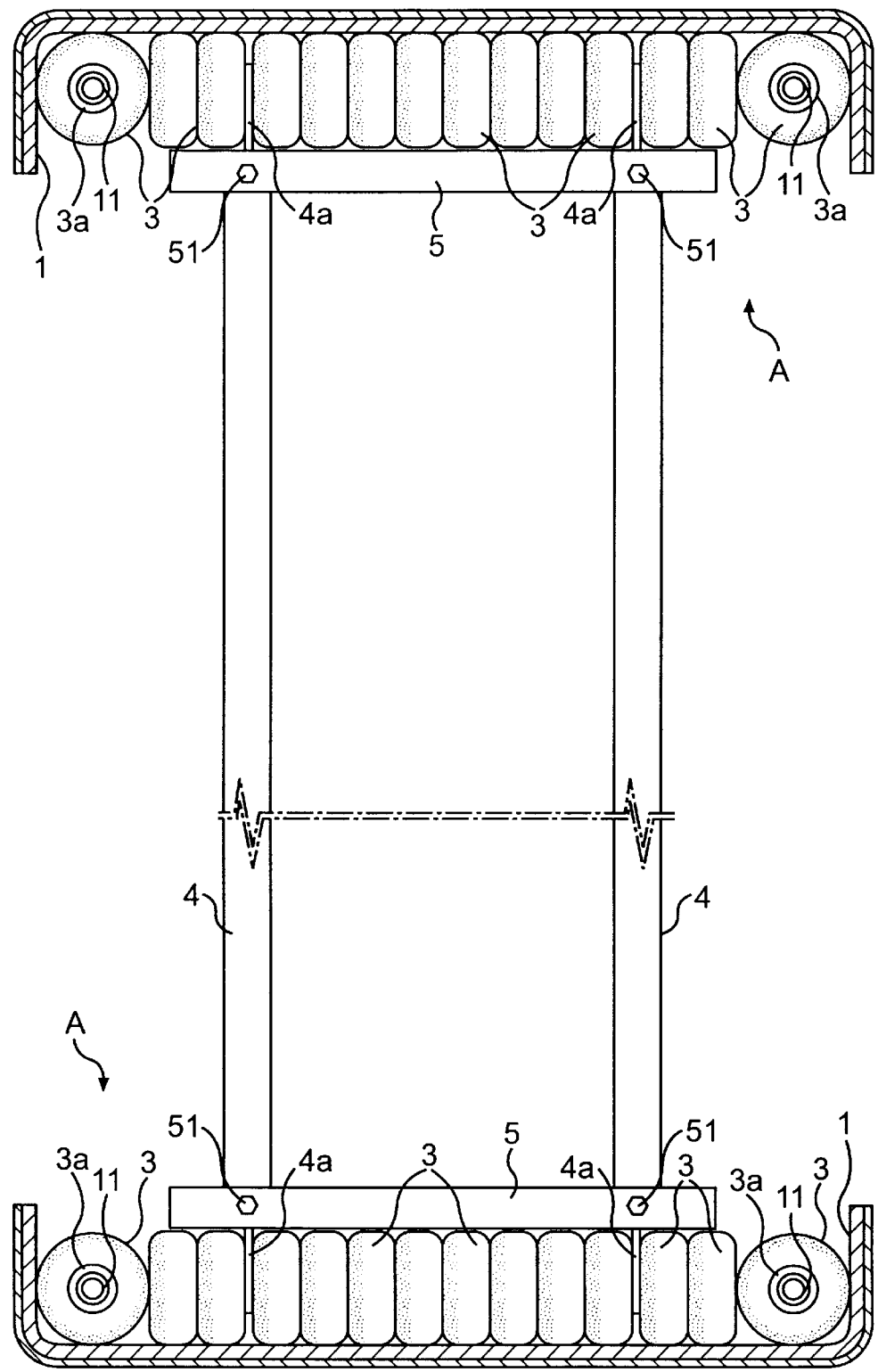
FIG. 3 is a plan view of FIG. 1.

The bumper A having the cushion tubes 3 of the present invention can be installed, in the same manner, on the front and rear portions of the typical vehicle, as shown in FIG. 3.

Hereinafter, an explanation of an impact-absorbing operation of the vehicle bumper according to the present invention will be in detail discussed.

If an external impact is applied to the bumper casing 1, it is primarily absorbed by means of the bumper casing 1, and is then transmitted to the horizontal axis 2 through which the plurality of cushion tubes 3 have been mounted. Next, the external impact is dispersed on the whole portion of the cushion tubes 3, and at this time, since the horizontal axis 2 moves in the direction of the tube frame 5 in proportion to impact load quantity by the formation of the rectangular hole 6 having the predetermined distance on the projection board 4a and by the action of the tube frame 5, the external impact is secondarily absorbed by the action of a compressed repulsion force from the plurality of cushion tubes 3. The compressed repulsion force and the damped impact quantity are interactive with the tube frame 5 to produce the elastic repulsion force, and therefore, by the action of the elastic repulsion force, the horizontal axis 2 of the cushion tubes 3 returns to its original position through the rectangular hole 6 formed on the projection board 4a. The external impact quantity damped continually by the interaction of the compressed repulsion force and the elastic repulsion force is applied to the bumper of the present invention to completely absorb the external impact against the vehicle. In other words, the vehicle bumper of the present invention has a similar mechanical function to a structure where a plurality of elastic springs which are coupled in parallel to each other are mounted.

However, in the case where the external impact exceeding the elastic repulsion force is applied to the vehicle body, it is primarily dispersed and absorbed by the destruction of the cushion tubes 3 or the bending of the horizontal axis 2, and is finally absorbed on the tube frame 5. Therefore, it can be understood that the vehicle bumper of the present invention can exert impact buffering performance greater than the existing bumpers.

In addition, the vehicle bumper of the present invention has a separate function of improving running stability of the vehicle. As shown in FIG. 3, the bumper of the present invention is coupled with the vehicle frame 4 and is installed symmetrically on the end portions of the front and rear portions of the vehicle, while having an appropriate load. Under the above construction, the center of mass of the vehicle disposed on the center portion of the vehicle frame 4 can be moved in the direction of the vehicle frame attached on the lower portion of the vehicle. This can prevent, in case of high speed running of the vehicle, buoyancy generation caused by the formation of current variation generated around the vehicle itself and thereby suspension of the vehicle itself from the road surface, which ensures the running stability. On the other hand, upon curved road running or rotary running, the vehicle bumper of the present invention can dispose the center of mass of the vehicle in a downward direction to thereby prevent the inclination to one side or overturn of the vehicle caused due to the centrifugal force.

As set forth in the above, a vehicle bumper of the present invention installs a plurality of cushion tubes in the interior thereof, to exhibit a buffering force and a recovering force against the external impact load applied in every direction, such that upon collision against an external object, it can serve as a safety bumper for fully preventing the vehicle itself and the passenger or the external object from being destroyed or damaged.

Although a preferred form of the invention has been described, it will be understood by those skilled in the field that variations therefrom, and analogous uses, are within the knowledge of those skilled in the art. Accordingly, it is intended that the scope of the invention be defined, not by the scope of the foregoing description, but rather by the scope of the claims as interpreted in view of the pertinent prior art.

What is claimed is:

1. A vehicle bumper comprising a plurality of cushion tubes installed in the interior of a bumper casing and each having a hub wheel mounted in series on a horizontal axle;

said horizontal axle being inserted through an elongated hole formed in each of a plurality of projection boards extending from a tube frame, said tube frame installed on the rear portion of said plurality of cushion tubes, for supporting said cushion tubes and a substantially vertical rod assembled on both ends of said horizontal axle to thereby couple a further said cushion tube in a horizontal state at each end of said horizontal axle.

2. The vehicle bumper as defined in claim 1, wherein said cushion tube is comprised of an elastic synthetic resin.

3. The vehicle bumper as defined in claim 1, wherein said elongated hole is rounded on both ends thereof on each said projection board.

* * * * *